(12) United States Patent  
McCaffrey

(10) Patent No.: US 10,731,498 B2  
(45) Date of Patent: Aug. 4, 2020

(54) BLADE OUTER AIR SEAL MOUNT

(71) Applicant: United Technologies Corporation, Hartford, CT (US)

(72) Inventor: Michael G. McCaffrey, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 632 days.

(21) Appl. No.: 15/112,657

(22) PCT Filed: Jan. 9, 2015

(86) PCT No.: PCT/US2015/010892  
§ 371 (c)(1),  
(2) Date: Jul. 19, 2016

(87) PCT Pub. No.: WO2015/112354  
PCT Pub. Date: Jul. 30, 2015

(65) Prior Publication Data  
US 2016/0333716 A1    Nov. 17, 2016

Related U.S. Application Data

(60) Provisional application No. 61/932,116, filed on Jan. 27, 2014.

(51) Int. Cl.  
*F01D 11/12* (2006.01)  
*F01D 11/16* (2006.01)  
(Continued)

(52) U.S. Cl.  
CPC ............... *F01D 11/12* (2013.01); *F01D 5/02* (2013.01); *F01D 11/16* (2013.01); *F01D 25/246* (2013.01);  
(Continued)

(58) Field of Classification Search  
CPC .... F01D 11/001; F01D 11/003; F01D 11/005; F01D 11/006; F01D 11/08; F01D 11/12;  
(Continued)

(56) References Cited

U.S. PATENT DOCUMENTS 4,596,116 A    6/1986  Mandet et al.  
4,642,024 A *  2/1987  Weidner ................ F01D 11/08  
                                                      415/116

(Continued)

FOREIGN PATENT DOCUMENTS

WO    2015038341 A1    3/2015  
WO    2015138027 A2    9/2015

OTHER PUBLICATIONS

International Search Report for International Application No. PCT/US2015/010892; dated Apr. 13, 2015.

(Continued)

*Primary Examiner* — Mark A Laurenzi  
*Assistant Examiner* — Loren C Edwards  
(74) *Attorney, Agent, or Firm* — Cantor Colburn LLP

(57) ABSTRACT

The present disclosure relates generally to blade outer air seal section mount including a resilient spring element that acts to provide re-centering forces to the blade outer air seal section when non-uniform forces applied to the blade outer air seal section causing it to move away from its nominal position.

18 Claims, 4 Drawing Sheets

(51) Int. Cl.
  *F01D 25/24* (2006.01)
  *F01D 5/02* (2006.01)
  *F02C 3/04* (2006.01)
  *F04D 29/16* (2006.01)
  *F04D 29/32* (2006.01)

(52) U.S. Cl.
  CPC .............. *F02C 3/04* (2013.01); *F04D 29/164* (2013.01); *F04D 29/321* (2013.01); *F05D 2220/32* (2013.01); *F05D 2230/64* (2013.01); *F05D 2240/11* (2013.01); *F05D 2260/38* (2013.01); *F05D 2260/52* (2013.01); *Y02T 50/672* (2013.01)

(58) Field of Classification Search
  CPC . F01D 11/16; F01D 11/22; F01D 5/02; F01D 25/246; F02C 3/04; F02C 7/20; F02C 7/28; F04D 29/164; F04D 29/321; F05D 2230/64; F05D 2240/11; F05D 2260/38; F05D 2260/52
  USPC .......................................................... 60/805
  See application file for complete search history.

(56) References Cited

U.S. PATENT DOCUMENTS

| | | | |
|---|---|---|---|
| 5,181,308 A | | 1/1993 | Gray |
| 5,456,576 A | * | 10/1995 | Lyon ..................... F01D 5/20 |
| | | | 415/173.3 |
| 5,593,278 A | | 1/1997 | Jourdain et al. |
| 7,189,057 B2 | * | 3/2007 | Lee ........................ F01D 11/16 |
| | | | 415/128 |
| 2003/0202876 A1 | | 10/2003 | Jasklowski |
| 2009/0079139 A1 | | 3/2009 | Schiavo et al. |
| 2009/0208322 A1 | | 8/2009 | McCaffrey |
| 2010/0232941 A1 | | 9/2010 | Smoke et al. |
| 2011/0189009 A1 | | 8/2011 | Shapiro |
| 2012/0027574 A1 | * | 2/2012 | Belanger ................. F01D 9/04 |
| | | | 415/174.2 |
| 2012/0189435 A1 | | 7/2012 | Morgan et al. |
| 2013/0017057 A1 | | 1/2013 | Lagueux |

OTHER PUBLICATIONS

Written Opinion for International Application No. PCT/US2015/010892; dated Apr. 13, 2015.
Supplementary European Search Report for Application EP 15 74 0665.

\* cited by examiner

BLADE OUTER AIR SEAL MOUNT

CROSS REFERENCE TO RELATED APPLICATION

This application is a National Phase Application of Patent Application PCT/US2015/010892 filed on Jan. 9, 2015, which claims the benefit of U.S. Ser. No. 61/932,116, filed Jan. 27, 2014. The entire contents of both of these applications are incorporated herein by reference thereto.

TECHNICAL FIELD OF THE DISCLOSURE

The present disclosure is generally related to gas turbine engines and, more specifically, to a blade outer air seal mount for a gas turbine engine.

BACKGROUND OF THE DISCLOSURE

Axial turbine engines generally include fan, compressor, combustor and turbine sections positioned along an axial centerline sometimes referred to as the engine's "axis of rotation". The fan, compressor, and combustor sections add work to air (also referred to as "core gas") flowing through the engine. The turbine extracts work from the core gas to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

Each rotor assembly typically includes a plurality of blades extending out from the circumference of a disk. Platforms extending laterally outward from each blade collectively form an inner radial flowpath boundary for core gas passing through the rotor assembly. An outer case, including blade outer air seals (BOAS), provides the outer radial flow path boundary. The blade outer air seal aligned with a particular rotor assembly is suspended in close proximity to the rotor blade tips to seal between the tips and the outer case. The sealing provided by the blade outer air seal helps to maintain core gas flow between rotor blades where the gas can be worked (or have work extracted).

Disparate thermal growth between the rotor assembly and the outer case can cause the rotor blade tips to "grow" radially and interfere with the aligned blade outer air seal. In some applications, the gap between the rotor blade tips and the blade outer air seal is increased to avoid the interference. A person of skill in the art will recognize, however, that increased gaps tend to detrimentally effect the performance of the engine, thereby limiting the value of this solution. In other applications, the blade outer air seals comprise an abradable material and the blade tips include an abrasive coating to encourage abrading of the blade outer air seals. The blade tips abrade the blade outer air seal until a customized clearance is left which minimizes leakage between the rotor blade tips and the blade outer air seal. In certain situations, unequal pressure loads may develop across the surface of the blade outer air seal, causing rotational forces that push the blade outer air seal out of the desired alignment.

Improvements are therefore needed in turbine engine rotor assembly blade outer air seals.

SUMMARY OF THE DISCLOSURE

In one embodiment, a blade outer air seal assembly is disclosed, comprising: a blade outer air seal section having a first end and a second end; a first block mount disposed adjacent the blade outer air seal section first end; a first spring element disposed between the blade outer air seal section first end and the first block mount; a second block mount disposed adjacent the blade outer air seal section second end; and a second spring element disposed between the blade outer air seal section second end and the second block mount.

In another embodiment, a gas turbine engine is disclosed, comprising: a compressor section, a combustor section, and a turbine section in serial flow communication, at least one of the compressor section and turbine section including at least one rotor; a blade outer air seal assembly disposed adjacent at least one of the at least one rotor, the blade outer air seal assembly comprising: a blade outer air seal section having a first end and a second end; a first block mount disposed adjacent the blade outer air seal section first end; a first spring element disposed between the blade outer air seal section first end and the first block mount; a second block mount disposed adjacent the blade outer air seal section second end; and a second spring element disposed between the blade outer air seal section second end and the second block mount.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
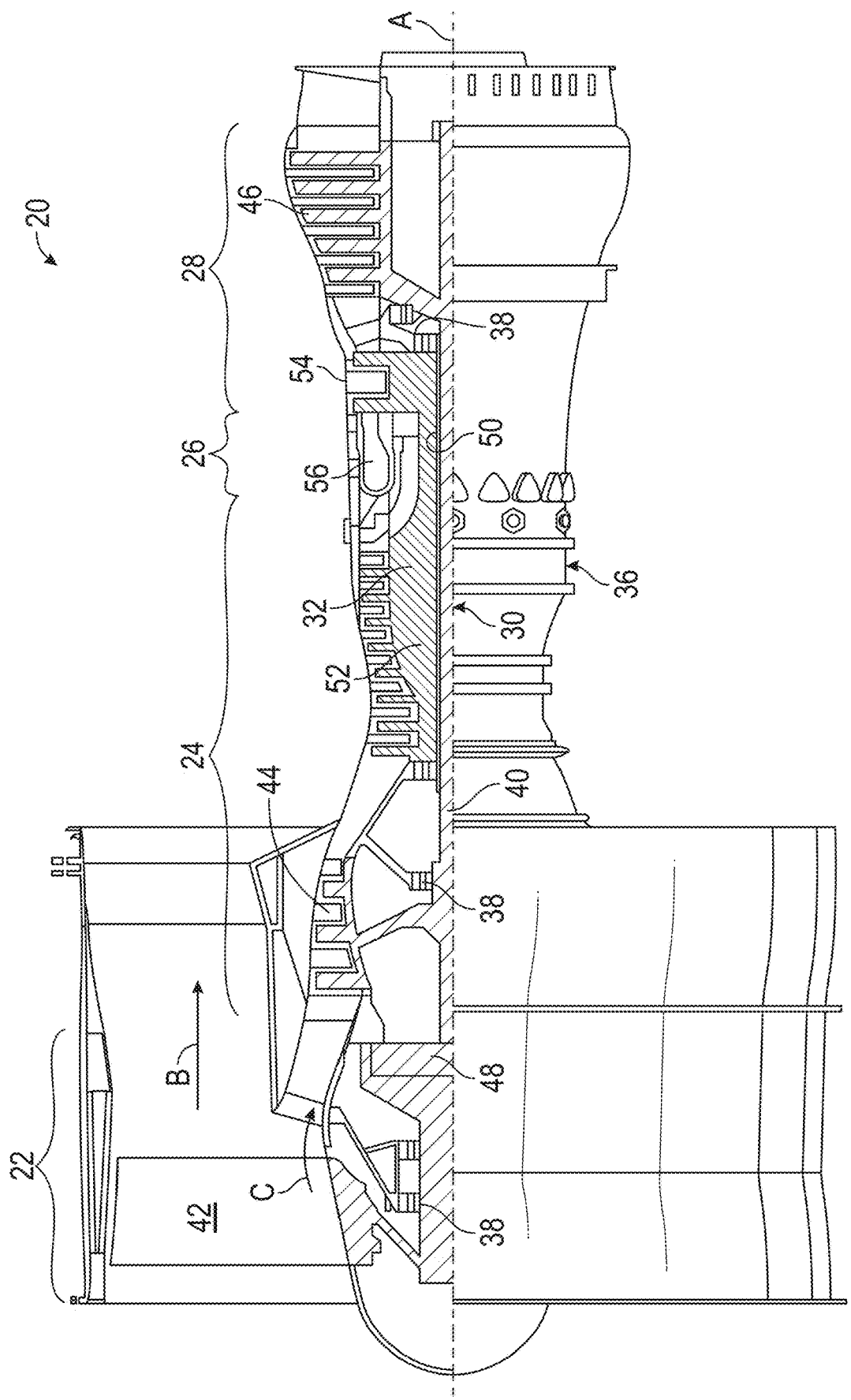
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second (350.52 meters/second).

Figure 2:
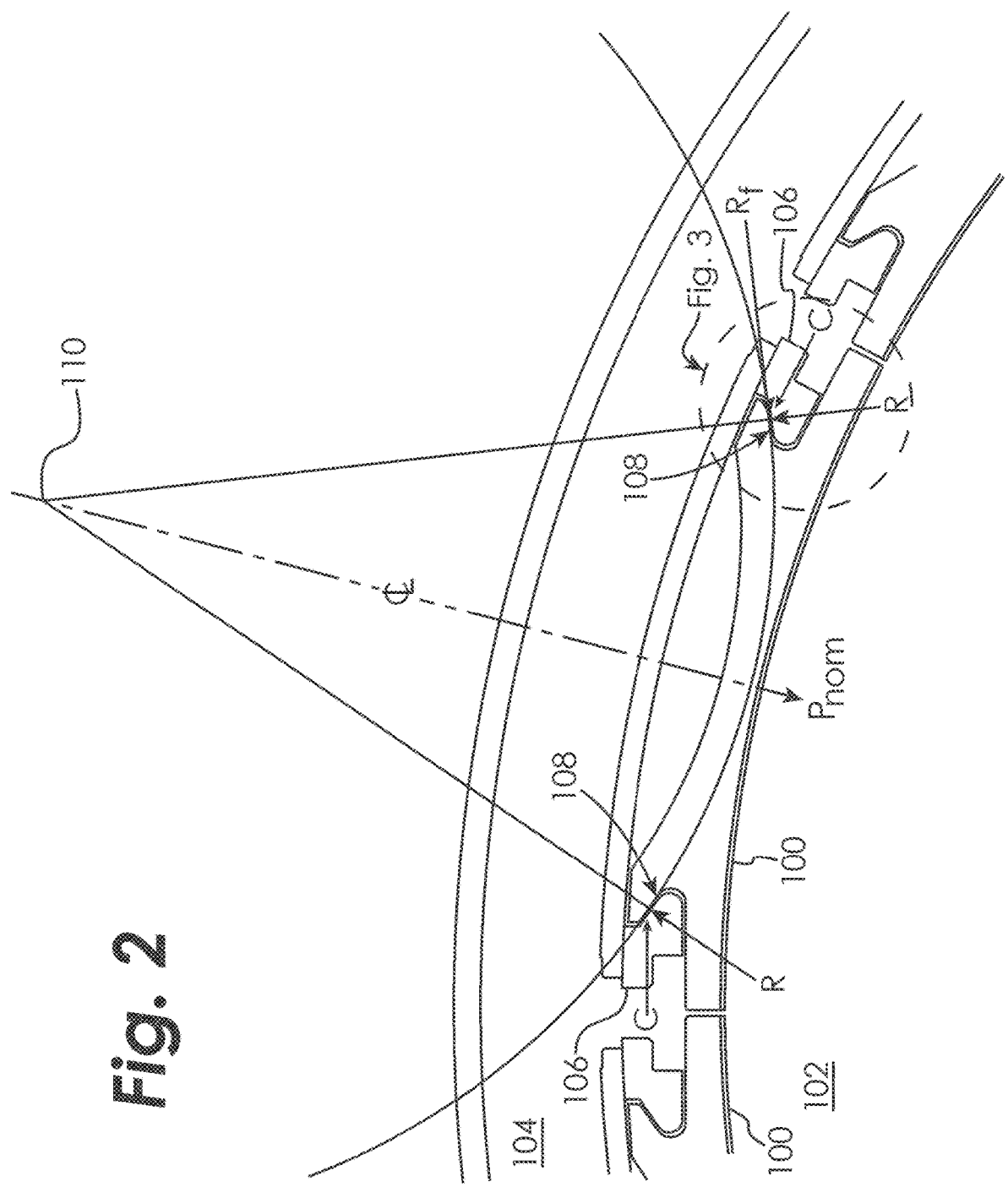
FIG. 2 is a schematic cross-sectional diagram of one section of a full hoop blade outer air seal in an embodiment.

FIG. 2 schematically illustrates one section of a full hoop blade outer air seal assembly in an embodiment, with one section of the blade outer air seal indicated at 100. The blade outer air seal section 100 provides sealing between the core gas flowpath 102 and the relatively lower temperature region 104. The circumferentially oriented blade outer air seal 100 can, in some embodiments, take advantage of mount schemes that are low stress, making them suitable for manufacturing the blade outer air seal section 100, at least in part, using all materials, including classes of non-ductile materials like ceramics, ceramic matrix composites, and molybdenum-alloys to name just three non-limiting examples. By reducing the number of constraints, and modes of load application, the blade outer air seal section 100 can, in some embodiments, tolerate large thermal and pressure loads. In the embodiment of FIG. 2, the blade outer air seal section 100 is carried by a pair of block mounts 106 having ramped surfaces 108 upon which the blade outer air seal section 100 is supported. The ramped surfaces provide a centering feature under nominal operating conditions. In some embodiments, the block mounts 106 may be made, at least in part, from nickel-based alloys, iron-based alloys, cobalt-based alloys, ceramic, ceramic matrix composite, or molybdenum-based alloys, to name just a few non-limiting examples.

A nominal (average) steady pressure $P_{nom}$ acts upon the blade outer air seal section 100 due to the pressure differential between the regions 102 and 104. Under nominal conditions, this pressure $P_{nom}$ is spread evenly onto each of the ramped surfaces 108, causing a reaction force R by each ramped surface 108, creating a compressive load C on the ramped surface 108. This compressive load C, acting on the ramped surface 108, creates a stable, centering load to maintain the blade outer air seal section 100 centered between the block mounts 106. However, any unsteady or non-circumferentially uniform load may result in the load of the blade outer air seal section 100 to not be evenly distributed between the two block mounts 106. This unequal distribution can create a reaction force $R_f$ that causes the blade outer air seal section 100 to shift about its natural "roll-center" 110 created by the opposing ramped surfaces 108 of the block mounts 106. This may be caused by one or more of a variety of causes, including non-uniform thermal and pressure loads. Adding slots and tabs for position control of the blade outer air seal section 100 are not suitable for these classes of non-ductile materials, because of the detrimental structural effects of a local slot or tab feature in a non-ductile material exposed to transient thermal loads.

Figure 3:
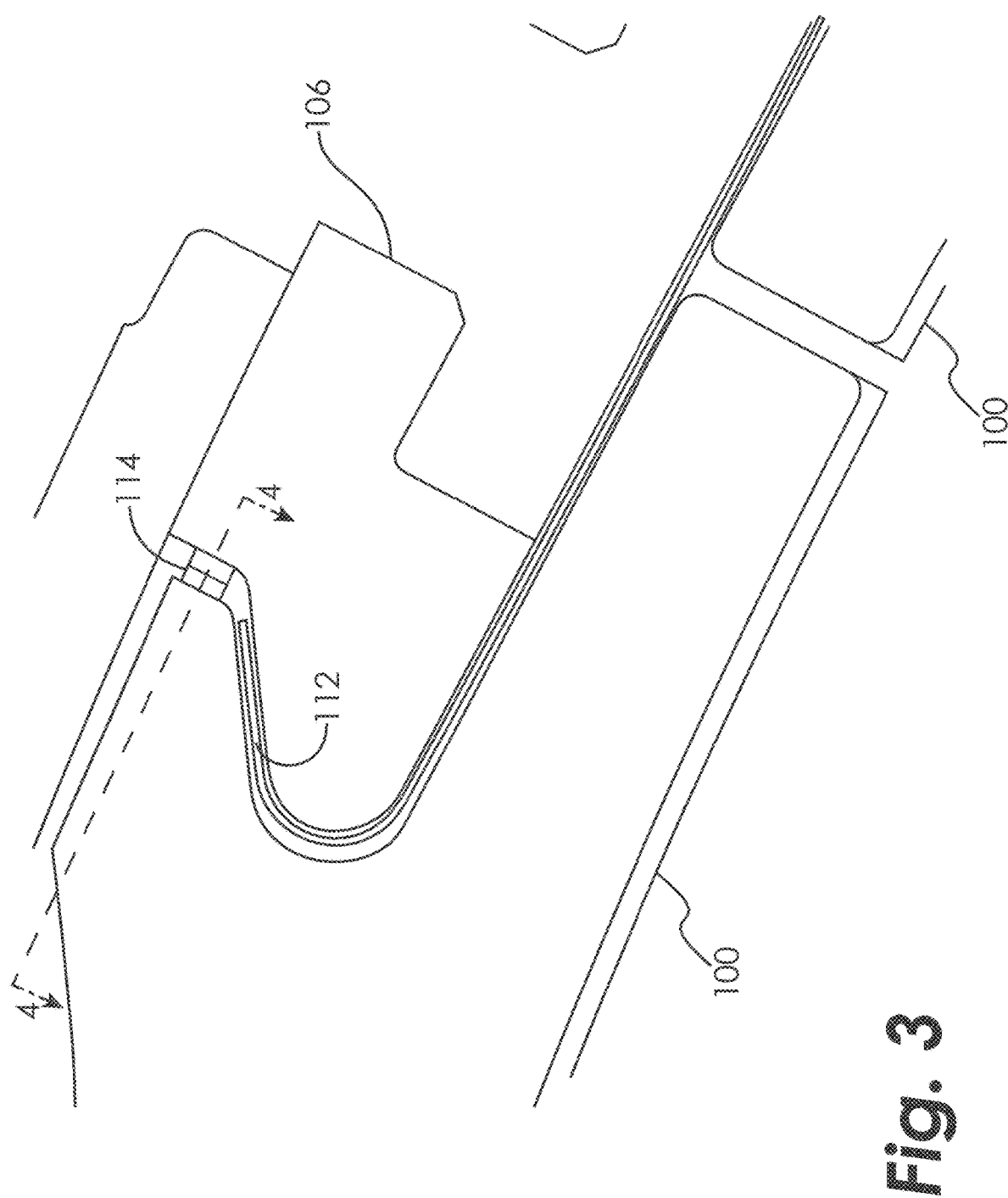
FIG. 3 is a schematic cross-sectional diagram of one section of a full hoop blade outer air seal in an embodiment.
Figure 4:
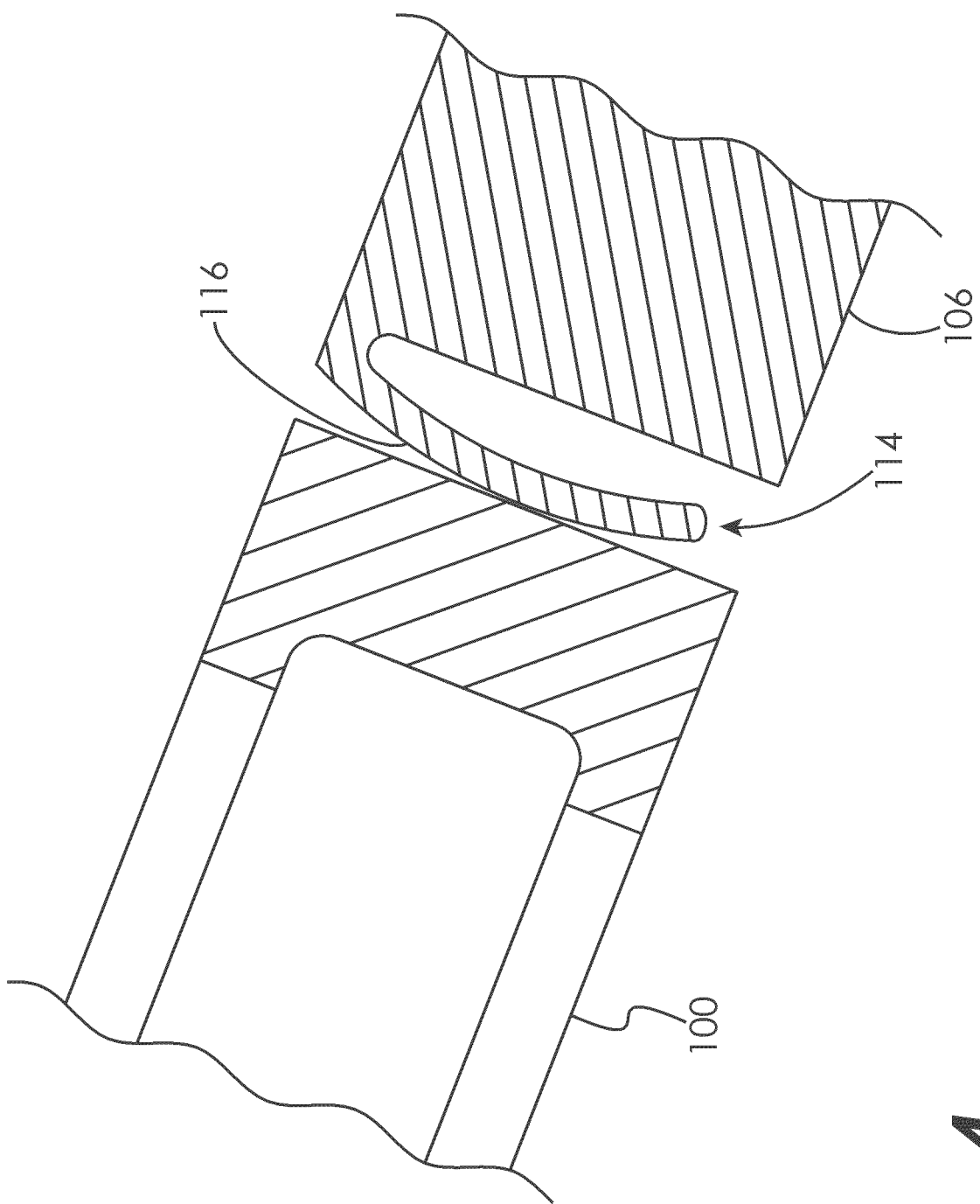
FIG. 4 is a schematic cross-sectional diagram of a portion of a blade outer air seal and block mount in an embodiment.

Referring now to FIGS. 3 and 4, a compliant shim or seal 112 is disposed between the blade outer air seal section 100 and the block mount 106. It is undesirable to rely on crushing the seal 112 to limit motion of the blade outer air seal 100. Additionally, such interaction between the blade outer air seal section 100 and the seal 112 will only limit the travel of the blade outer air seal 100, and will not act to re-center the blade outer air seal section 100 after it has moved away from its nominal position. Therefore, a spring element 114 is added between the blade outer air seal section 100 and the block mount 106 that is operative to counteract any reaction force $R_f$ by applying a balancing force in the opposite direction when compressed, thereby re-centering the blade outer air seal section 100 between the block mounts 106 (or at least limiting the magnitude of the movement away from the centered position). In one embodiment, the spring element 114 is formed integrally with the block mount 106, such as by an arm 116 extending from the block mount 106 to name just one non-limiting embodiment. The spring element 114 may be composed of cobalt-based alloy, iron-based alloy or nickel-based alloy, to name just a few non-limiting examples. In other embodiments, the spring element 114 is not formed integrally with the block mount 106 and instead comprises a separate component or components disposed between the blade outer air seal section 100 and the block mount 106. The spring element 114 may be soft or firm. For example, the spring element 114 may comprise a leaf spring, a coil spring, an O-seal, a C-seal, a W-seal, a ceramic rope-seal, or a wire-brush seal, to name just a few non-limiting examples.

The spring rate of the spring element 114 may be chosen based upon the specific application. In some embodiments, the spring element 114 may act to center the blade outer air seal section 100 while at the same time being tolerant of thermal transient growth, such that excessive loads are not applied to the non-ductile material of the blade outer air seal section 100 at worst case tolerances and thermal changes. In some embodiments, the spring element 114 can accommodate the blade outer air seal section 100 growth relative to surrounding structures, while maintaining the centrality of the blade outer air seal 100.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A blade outer air seal assembly, comprising:
   a blade outer air seal section having a first end and a second end;
   a first block mount separate from the blade outer air seal section, the first block mount having a first ramped surface disposed adjacent the blade outer air seal section first end;
   a first seal disposed between the first ramped surface of the first block mount and the blade outer air seal section first end, wherein the first seal only limits movement of the blade outer air seal section and does not provide a re-centering force to the blade outer air seal section after the blade outer air seal section has moved from a nominal position;
   a first spring element disposed between the blade outer air seal section first end and the first block mount, wherein the first spring element provides the re-centering force to the blade outer air seal section after the blade outer air seal section has moved from the nominal position;
   a second block mount having a second ramped surface disposed adjacent the blade outer air seal section second end;
   a second seal disposed between the second ramped surface of the second block mount and the blade outer air seal section second end, wherein the second seal only limits movement of the blade outer air seal section and does not provide the re-centering force to the blade outer air seal section after the blade outer air seal section has moved from the nominal position; and
   a second spring element disposed between the blade outer air seal section second end and the second block mount, wherein the second spring element provides the re-centering force to the blade outer air seal section after the blade outer air seal section has moved from the nominal position, wherein the blade outer air seal section is capable of independent movement with respect to the first block mount and the second block mount.

2. The blade outer air seal assembly of claim 1, wherein the first spring element and the second spring element comprise a spring element selected from the group comprising: a leaf spring, a coil spring, an O-seal, a C-seal, a W-seal, a ceramic rope-seal, or a wire-brush seal.

3. The blade outer air seal assembly of claim 1, wherein the first and second block mounts are formed, at least in part, from a material selected from the group comprising: nickel-based alloys, iron-based alloys, cobalt-based alloys, ceramic, ceramic matrix composite, or molybdenum-based alloys.

4. The blade outer air seal assembly of claim 1, wherein the first and second spring elements apply a balancing force to the blade outer air section (100) after the blade outer air seal section has moved from the nominal position.

5. The blade outer air seal assembly of claim 4, wherein the balancing force re-centers the blade outer air seal section between the first and second block mounts.

6. The blade outer air seal assembly of claim 1, wherein the first spring element is integrally formed with the first block mount and the second spring element is integrally formed with the second block mount.

7. The blade outer air seal assembly of claim 6, wherein the first spring element comprises a first arm integrally formed with the first block mount and the second spring element comprises a second arm integrally formed with the second block mount.

8. The blade outer air seal assembly of claim 1, wherein the first spring element is not integrally formed with the first block mount and the second spring element is not integrally formed with the second block mount.

9. The blade outer air seal assembly of claim 1, wherein:
   the first spring element is substantially in contact with the blade outer air seal section first end and with the first block mount; and
   the second spring element is substantially in contact with the blade outer air seal section second end and with the second block mount.

10. A gas turbine engine, comprising:
    a compressor section, a combustor section, and a turbine section in serial flow communication, at least one of the compressor section and turbine section including at least one rotor;
    a blade outer air seal assembly disposed adjacent at least one of the at least one rotor, the blade outer air seal assembly comprising:

a blade outer air seal section having a first end and a second end;

a first block mount separate from the blade outer air seal section, the first block mount having a first ramped surface disposed adjacent the blade outer air seal section first end;

a first seal disposed between the first ramped surface of the first block mount and the blade outer air seal section first end, wherein the first seal only limits movement of the blade outer air seal section and does not provide a re-centering force to the blade outer air seal section after the blade outer air seal section has moved from a nominal position;

a first spring element disposed between the blade outer air seal section first end and the first block mount, wherein the first spring element provides the re-centering force to the blade outer air seal section after the blade outer air seal section has moved from the nominal position;

a second block mount having a second ramped surface disposed adjacent the blade outer air seal section second end;

a second seal disposed between the second ramped surface of the second block mount and the blade outer air seal section second end, wherein the second seal only limits movement of the blade outer air seal section and does not provide the re-centering force to the blade outer air seal section after the blade outer air seal section has moved from the nominal position; and a second spring element disposed between the blade outer air seal section second end and the second block mount, wherein the second spring element provides the re-centering force to the blade outer air seal section after the blade outer air seal section has moved from the nominal position, wherein the blade outer air seal section is capable of independent movement with respect to the first block mount and the second block mount.

11. The gas turbine engine of claim 10, wherein first spring element and the second spring element comprise a spring element selected from the group comprising: a leaf spring, a coil spring, an O-seal, a C-seal, a W-seal, a ceramic rope-seal, or a wire-brush seal.

12. The gas turbine engine of claim 10, wherein the first and second block mounts are formed, at least in part, from a material selected from the group comprising: nickel-based alloys, iron-based alloys, cobalt-based alloys, ceramic, ceramic matrix composite, or molybdenum-based alloys.

13. The gas turbine engine of claim 10, wherein the first and second spring elements apply a balancing force to the blade outer air seal section (100) after the blade outer air seal section has moved from the nominal position.

14. The gas turbine engine of claim 13, wherein the balancing force re-centers the blade outer air seal section between the first and second block mounts.

15. The gas turbine engine of claim 10, wherein the first spring element is integrally formed with the first block mount and the second spring element is integrally formed with the second block mount.

16. The gas turbine engine of claim 15, wherein the first spring element comprises a first arm integrally formed with the first block mount and the second spring element comprises a second arm integrally formed with the second block mount.

17. The gas turbine engine of claim 10, wherein the first spring element is not integrally formed with the first block mount and the second spring element is not integrally formed with the second block mount.

18. The gas turbine engine of claim 10, wherein:
the first spring element is substantially in contact with the blade outer air seal section first end and with the first block mount; and
the second spring element is substantially in contact with the blade outer air seal section second end and with the second block mount.

\* \* \* \* \*